United States Patent
Cheng et al.

(10) Patent No.: US 7,489,525 B2
(45) Date of Patent: Feb. 10, 2009

(54) ELECTRONIC DEVICE

(75) Inventors: Chien-Sheng Cheng, Taipei (TW); Kan-Yu Chu, Taipei (TW); Chi-Shiang Su, Taipei (TW); Chine-Hsum Wu, Taipei (TW); Shyang-Lin Wang, Taipei (TW); Feng-Hsu Chang, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/798,272

(22) Filed: May 11, 2007

(65) Prior Publication Data

US 2008/0123314 A1    May 29, 2008

(30) Foreign Application Priority Data

Nov. 24, 2006   (TW) .............................. 95143489 A

(51) Int. Cl.
*H05K 7/02* (2006.01)
(52) U.S. Cl. ..................... 361/809; 361/683; 455/556.1
(58) Field of Classification Search ................. 361/683, 361/809; 348/373, 211; 455/556.1
See application file for complete search history.

(56) References Cited

U.S. PATENT DOCUMENTS

| | | | | |
|---|---|---|---|---|
| 6,118,653 A | * | 9/2000 | Kim | 361/683 |
| 7,241,060 B2 | * | 7/2007 | Mootz et al. | 396/421 |
| 7,286,181 B2 | * | 10/2007 | Cha | 348/373 |
| 2005/0168924 A1 | * | 8/2005 | Wu et al. | 361/683 |
| 2005/0201047 A1 | * | 9/2005 | Krah | 361/683 |
| 2007/0165372 A1 | * | 7/2007 | Ye | 361/683 |

* cited by examiner

*Primary Examiner*—Jeremy C Norris
*Assistant Examiner*—Andargie M Aychillhum
(74) *Attorney, Agent, or Firm*—Birch, Stewart, Kolasch & Birch, LLP

(57) ABSTRACT

An electronic device includes a housing, a first connecting element, a second connecting element, and a lens module. In this case, the first connecting element pivots on the housing, and deflects relative to the housing in a first swing direction. The second connecting element pivots on the first connecting element, and deflects relative to the first connecting element in a second swing direction. The lens module connects with the second connecting element. Therefore, because the lens module of the electronic device can be deflected in both the first and the second swing directions, the lens module can retrieve images from a broader scope.

8 Claims, 5 Drawing Sheets

ELECTRONIC DEVICE

BACKGROUND OF THE INVENTION

1. Field of Invention

The invention relates to an electronic device and, in particular, to an electronic device having a lens module, which is multi-direction rotatable.

2. Related Art

As shown in FIG. 1, a conventional electronic device 1 includes a housing 11 and a lens module 12. A camera lens 121 is disposed at one side of the lens module 12, and two ends of the lens module 12 are both pivoted on the housing 11. Thus, the lens module 12 is rotatable relative to the housing 11. As shown in FIG. 1, the lens module 12 can rotate about the X axis, so the shooting angle of the lens module 12 is roughly between 0 and 270 degrees.

However, because the two ends of the lens module 12 are pivoted on the housing 11, the location of the lens module 12 is restricted within the housing 11. If the user wants to shoot images from different locations, the entire electronic device 1 must be moved, for example, to a higher or lower position. Furthermore, the lens module 12 can only rotate along a single axis, so the shooting angle of the camera lens 121 is limited.

SUMMARY OF THE INVENTION

In view of the foregoing, the invention is to provide an electronic device, in which the location and angle of the lens module can be changed more flexibly.

To achieve the above, the invention discloses an electronic device including a housing, a first connecting element, a second connecting element, and a lens module. The first connecting element pivots on the housing, and deflects relative to the housing in a first swing direction. The second connecting element pivots on the first connecting element, and deflects relative to the first connecting element in a second swing direction. The lens module connects with the second connecting element.

As mentioned above, the electronic device of the invention has the first and second connecting elements, which allow the lens module to be moved into or out of the accommodating portion of the housing. In addition, the position of the lens module can be changed via the first and second connecting elements. Therefore, to accommodate actual shooting situations, the user can adjust the position of the lens module by deflecting the first and second connecting elements. Moreover, the lens module is rotatable relative to the second connecting element. Thus, the user can rotate the lens module to adjust it to the desired position or angle to retrieve an image.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
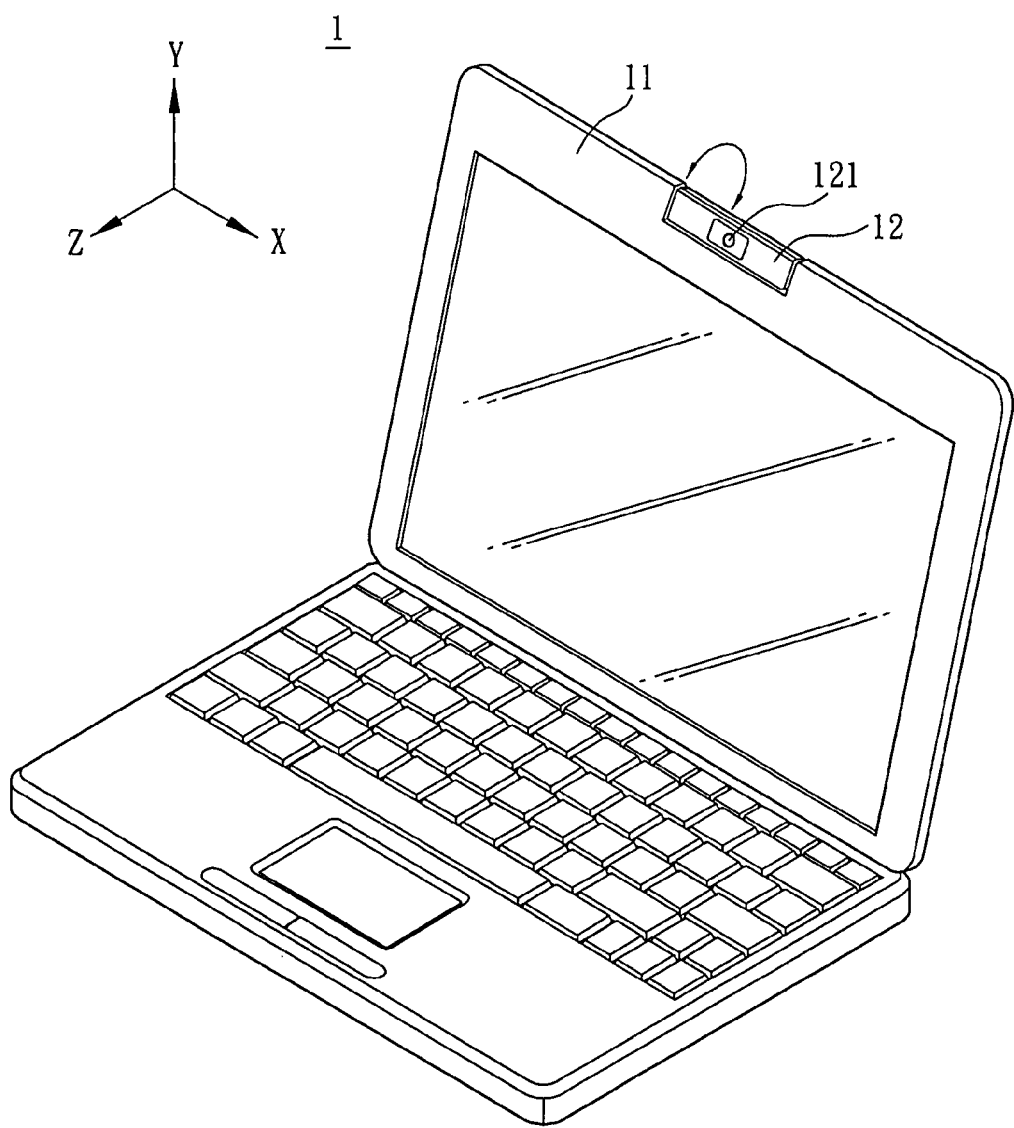
FIG. 1 is a schematic view showing a conventional electronic device.
Figure 2:
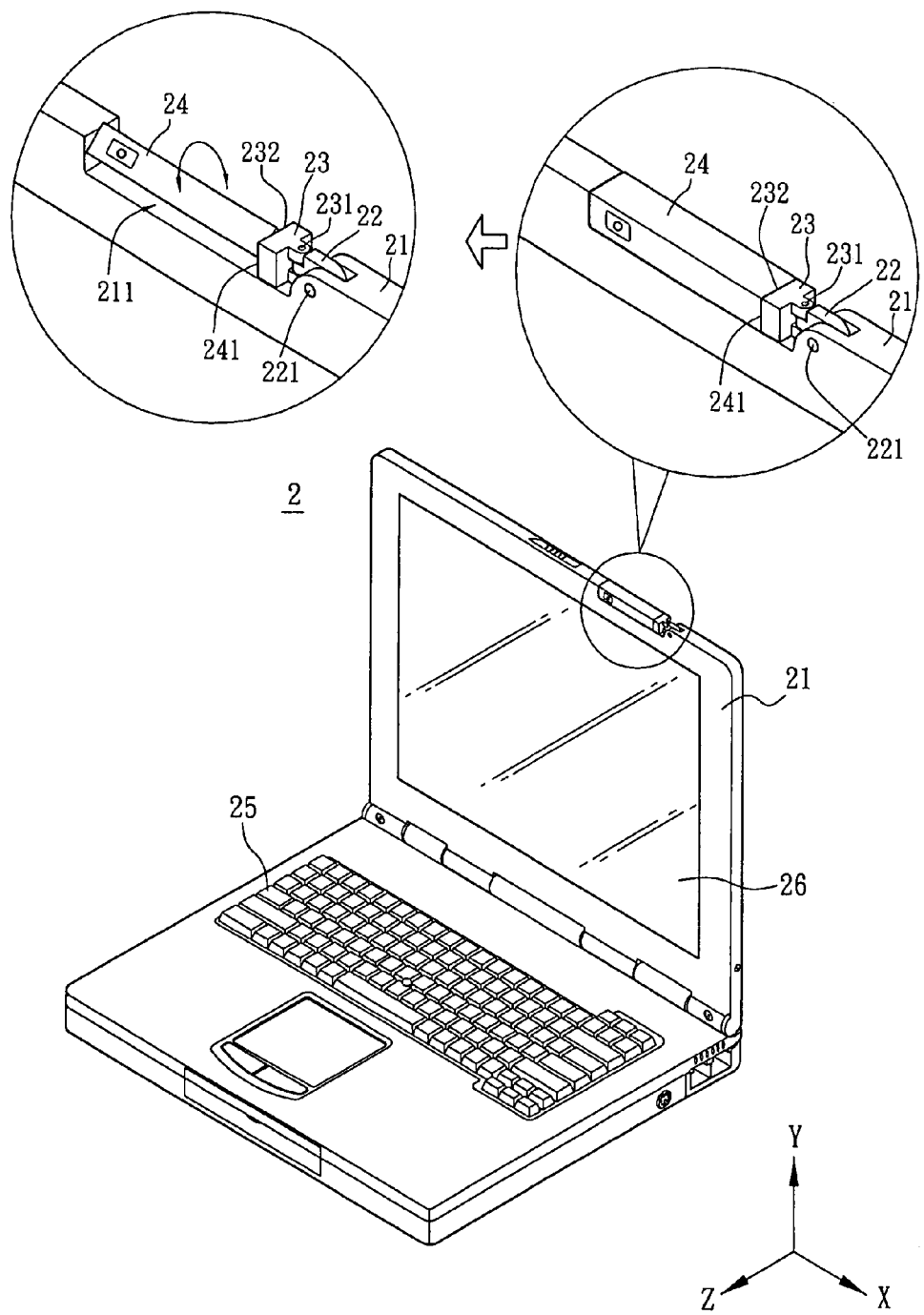
FIG. 2 is a schematic view showing an electronic device according to a preferred embodiment of the invention.

With reference to FIG. 2, an electronic device 2 according to a preferred embodiment of the invention includes a housing 21, a first connecting element 22, a second connecting element 23 and a lens module 24. In this embodiment, the electronic device 2 is, for example, a notebook computer.

As shown in FIG. 2, the housing 21 has an accommodating portion 211. In the embodiment, the electronic device 2 further includes an input module 25, a display module 26 and a CPU (not shown). The input module 25, display module 26 and CPU are electrically connected with each other and are both disposed inside the housing 21. The input module 25 and the display module 26 are partially exposed from the housing 21. Thus, the user can use the input module 25 to input information to the CPU, and the display module 26 can than display the information. It is to be noted that the input module 25, display module 26 and CPU are not characters of the invention, so the detailed descriptions thereof are omitted.

Figure 3:
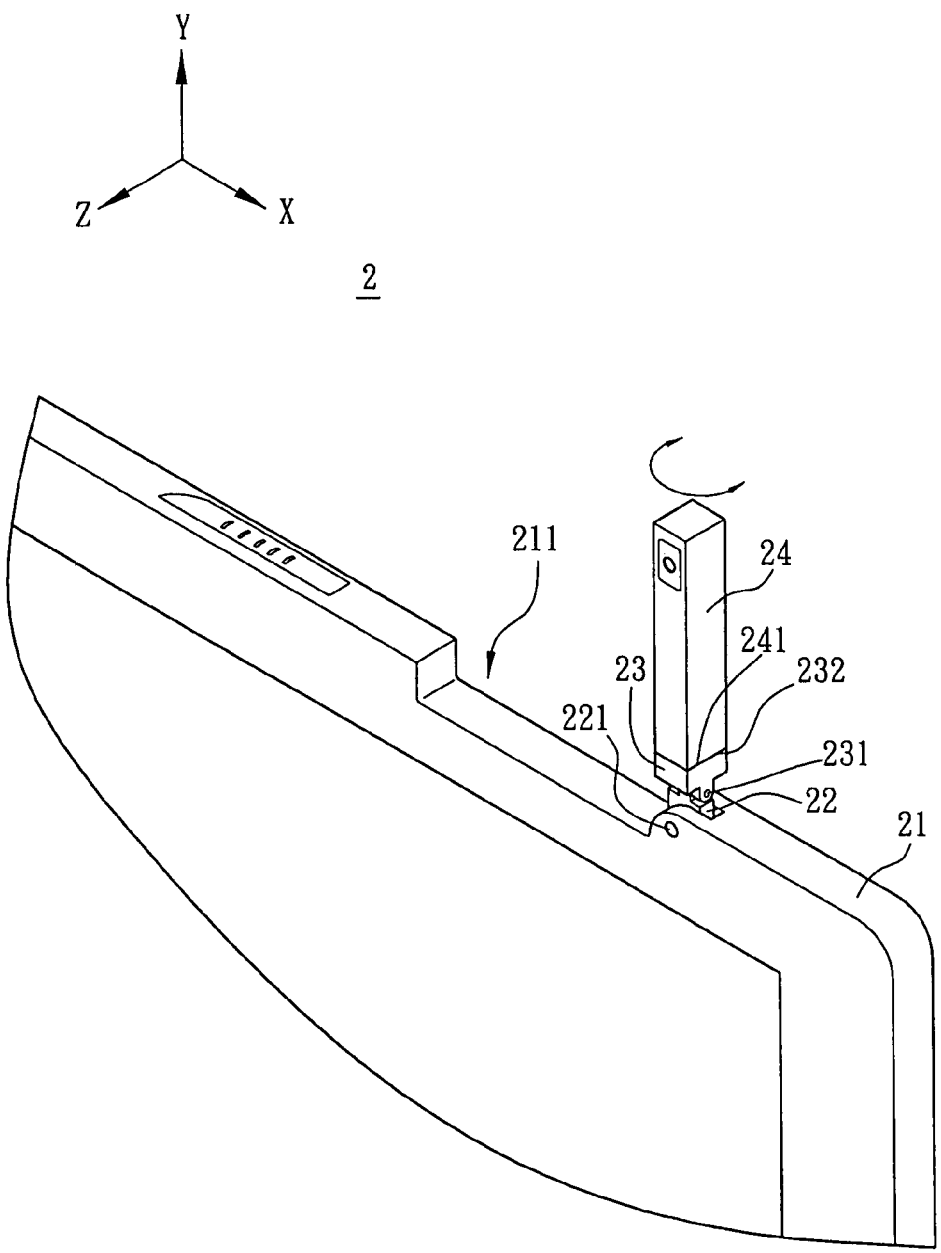
FIG. 3 is a schematic view showing the electronic device according to the embodiment of the invention, wherein the first connecting element deflects in a first swing direction.

With reference to FIG. 3, the first connecting element 22 pivots on the housing 21 and is capable of deflecting in a first swing direction. In the embodiment, the first connecting element 22 has a first axle 221, which goes through the first connecting element 22 and the housing 21 along the Z axis. Therefore, the first swing direction along which the first connecting element 22 can deflect is along the X-Y plane. When the first connecting element 22 deflects in the first swing direction, the lens module 24 is correspondingly moved out of the accommodating portion 211 of the housing (as shown in FIG. 3) or moved into the accommodating portion 211 (as shown in FIG. 2).

Referring to FIG. 2 again, the second connecting element 23 is pivoted on the first connecting element 22. The second connecting element 23 is capable of deflecting relative to the first connecting element 22 in a second swing direction, which is roughly perpendicular to the first swing direction. In the embodiment, the second connecting element 23 has a second axle 231, which is disposed between the first connecting element 22 and the second connecting element 23. As shown in FIG. 3, the second axle 231 goes through the first connecting element 22 and the second connecting element 23 along the X axis. Therefore, the second swing direction along which the second connecting element 23 can deflect is along the Y-Z plane. When the second connecting element 23 deflects in the second swing direction, the lens module 24 is correspondingly moved.

Figure 4:
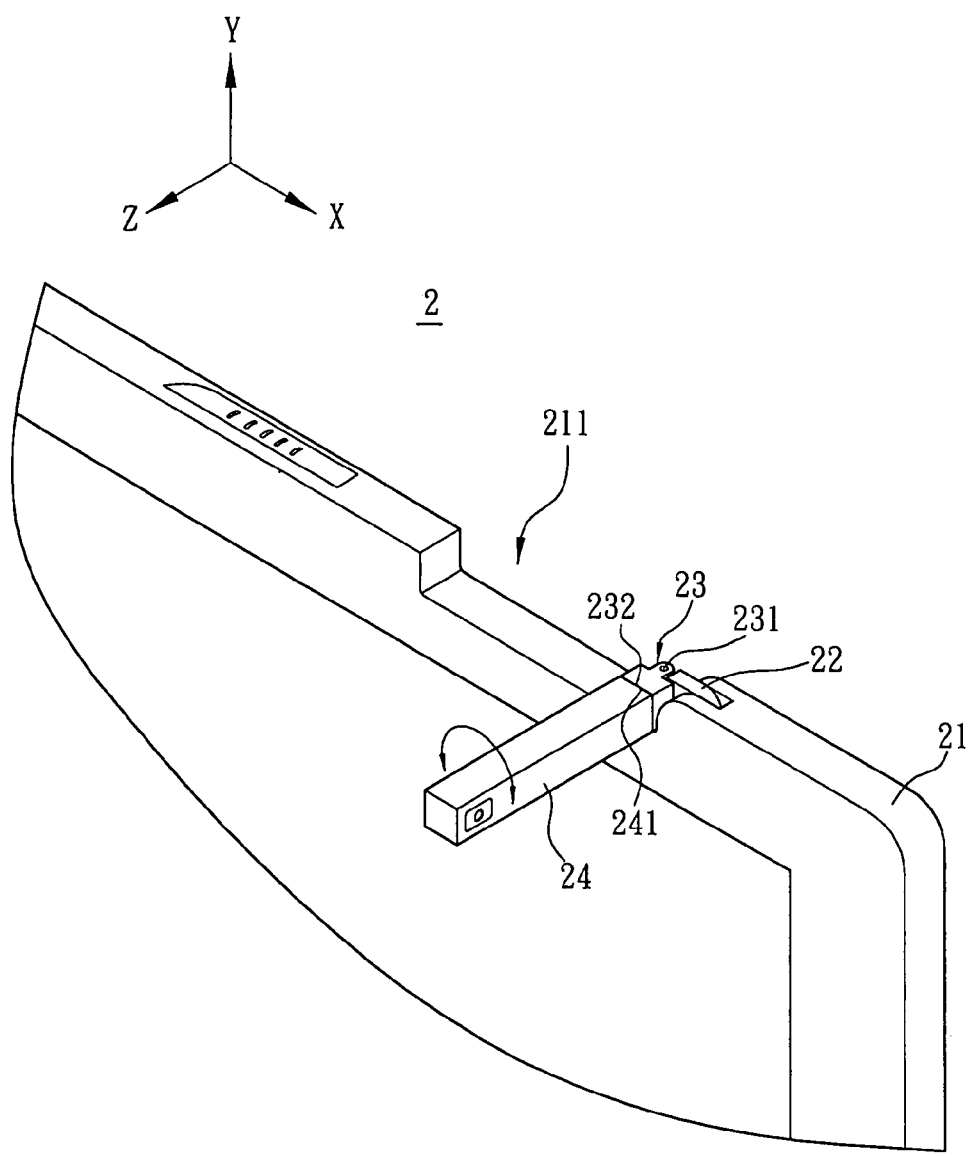
FIG. 4 is a schematic view showing the electronic device according to the embodiment of the invention, wherein the second connecting element deflects in a second swing direction.

As shown in FIG. 4, the second axle 231 is parallel to the Y axis. In this case, the second swing direction along which the second connecting element 23 can deflect is along the X-Z plane. When the second connecting element 23 deflects in the second swing direction, the lens module 24 is correspondingly moved out of the accommodating portion 211 of the housing 21. Furthermore, the second connecting element 23 has a first end 232, which is located away from the first connecting element 22. In the embodiment, the first end 232 is, for example, formed with a depression.

With reference to FIG. 2 to FIG. 5, the lens module 24 is connected with the second connecting element 23. Herein, the lens module 24 is a web cam, and the lens module 24 is pivoted on the second connecting element 23. The lens module 24 has a second end 241, which is, for example, formed with a protrusion. Therefore, the second end 241 can be pivotally connected with the first 232 of the second connecting element 23. Accordingly, the lens module 24 can rotate relative to the second connecting element 23. The rotation directions are as the arrows shown in FIG. 2 to FIG. 5. Alternatively, the first end 232 may be formed with a protrusion, and the second end 241 may be formed with a depression. In this case, the first end 232 can be pivotally connected with the second end 241, so the lens module 24 can also rotate relative to the second connecting element 23.

To make the invention more comprehensively understood, the actual operation of the electronic device 2 will be described hereinafter.

As shown in FIG. 2, the lens module 24 is initially located in the accommodating portion 211 of the housing 21 and the second end 241 is pivotally connected with the first end 232. When the user wants to shoot an image with the lens module 24, he or she can directly rotate the lens module 24 in the accommodating portion 211 (as the arrow shown in FIG. 2) to change the shooting angle of the lens module 24.

When the user wants to move the lens module 24 out of the accommodating portion 211, as shown in FIG. 3, he or she can push/pull the lens module 24 to deflect along the first swing direction with the first connecting element 22. Thus, the lens module 24 leaves the accommodating portion 211 of the housing 21 along the X-Y plane. In this case, the lens module 24 deflects along the first swing direction by 90 degrees.

Figure 5:
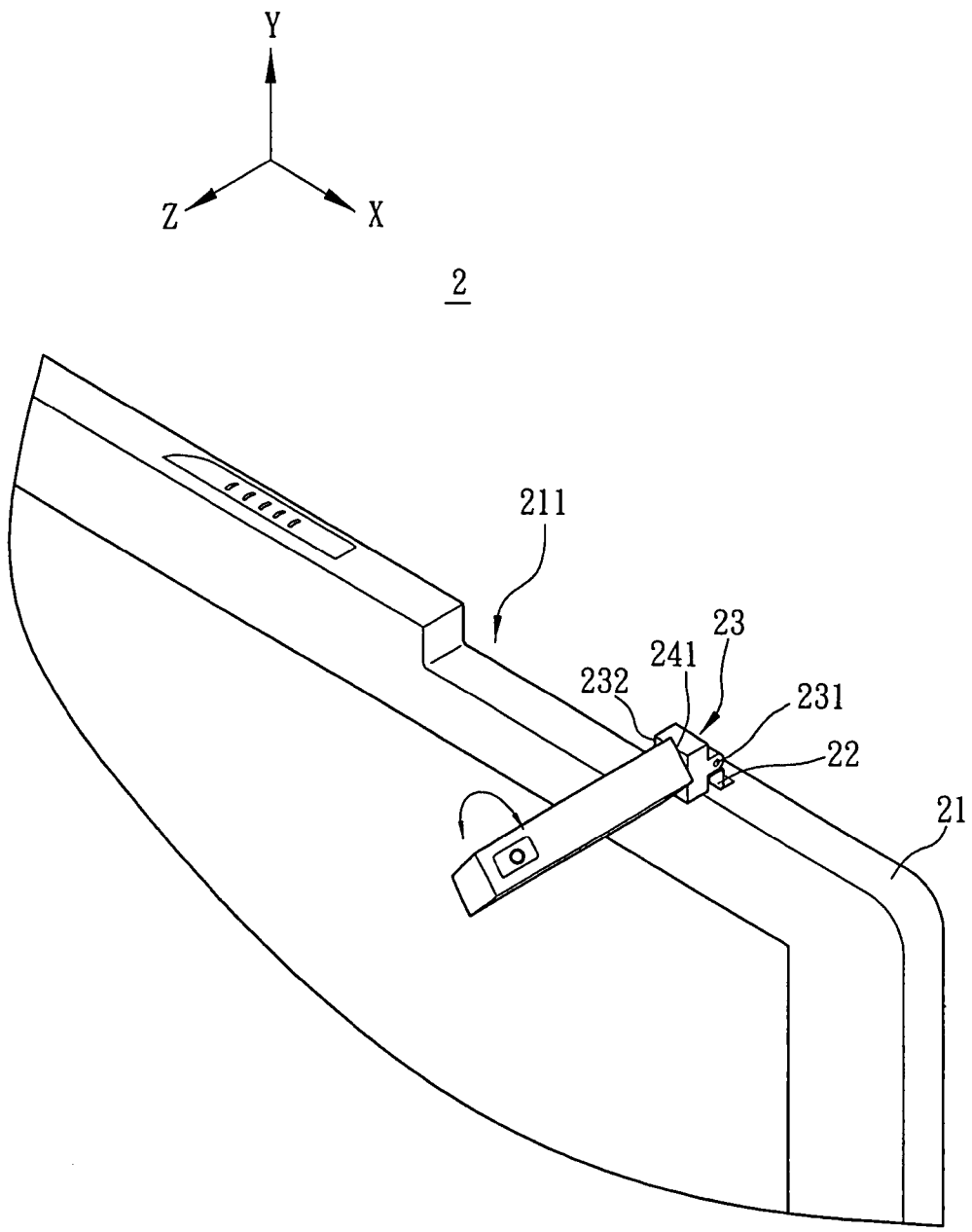
FIG. 5 is a schematic view showing the electronic device according to the embodiment of the invention, wherein the first connecting element deflects in a first swing direction, the second connecting element deflects in a second swing direction, and the lens module rotates relative to the second connecting element.

As shown in FIG. 4, the user can push/pull the lens module 24 to deflect along the second swing direction with the second connecting element 23. Therefore, the lens module 24 leaves the accommodating portion 211 of the housing 21 along the X-Z plane. Alternatively, as shown in FIG. 5, the user can push/pull the lens module 24 to deflect along the first swing direction by 90 degrees with the first connecting element 22. Therefore, the lens module 24 leaves the accommodating portion 211 of the housing 21 along the X-Y plane. Then, the user can further push/pull the lens module 24 to deflect along the second swing direction by 90 degrees with the second connecting element 23. Therefore, the lens module 24 is deflected along the Y-Z plane. Finally, the lens module 24 is rotated relative to the second connecting element 23 (as the arrow shown in FIG. 5) by 45 degrees so as to adjust the shooting angle of the lens module 24. According to the above mentioned methods, the user can precisely adjust the position and angle of the lens module 24, which make the shooting job more convenient.

In the above embodiment, the first connecting element 22, the second connecting element 23 and the lens module 24 are deflected by 45 or 90 degrees. In practice, they can be deflected by any desired angle without limitation to the above angles.

In summary, the electronic device of the invention has the first and second connecting elements, which allows the lens module to be moved into or out of the accommodating portion of the housing. In addition, the position of the lens module can be changed via the first and second connecting elements. Therefore, to accommodate actual shooting situations, the user can adjust the position of the lens module by deflecting the first and second connecting elements. Moreover, the lens module is rotatable relative to the second connecting element. Thus, the user can rotate the lens module to adjust it to the desired position or angle to retrieve an image.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An electronic device comprising: a housing; a first connecting element pivoting on the housing deflecting relative to the housing in a first swing direction, wherein the first swing direction is along a first plane; a second connecting element pivoting on the first connecting element deflecting relative to the first connecting element in a second swing direction, wherein the second swing direction is along a second plane, and the second plane is orthogonal to the first plane; and a lens module connecting with the second connecting element; and the first connecting element has a first axle, and the first axle goes through the first connecting element and the housing.

2. The device according to claim 1, wherein the housing has an accommodating portion, and the first connecting element deflects along the first swing direction moving the lens module into or out of the accommodating portion.

3. The device according to claim 1, wherein the housing has an accommodating portion, and the second connecting element deflects along the second swing direction moving the lens module into or out of the accommodating portion.

4. The device according to claim 1, wherein first swing direction is substantially perpendicular to the second swing portion.

5. The device according to claim 1, wherein the lens module pivots on the second connecting element.

6. The device according to claim 1, wherein a first end of the second connecting element pivots on a second end of the lens module.

7. The device according to claim 1, wherein the housing has a display surface, and the first plane is parallel to the display surface.

8. The device according to claim 1, wherein the housing further comprises a gap, split at the top edge of the housing, wherein the first connecting element exposes from the gap.

* * * * *